INVENTOR.
ALLEN STRICKLER

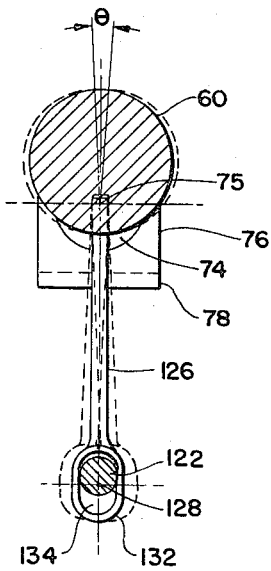
FIG. 2
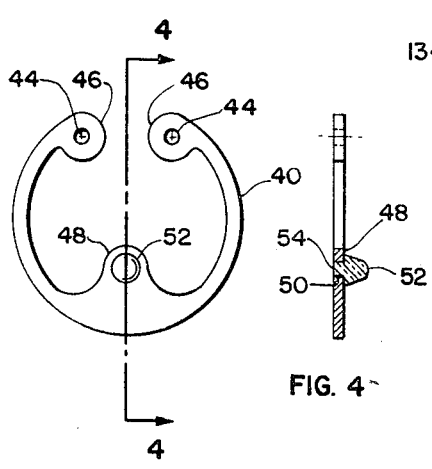
FIG. 3
FIG. 4
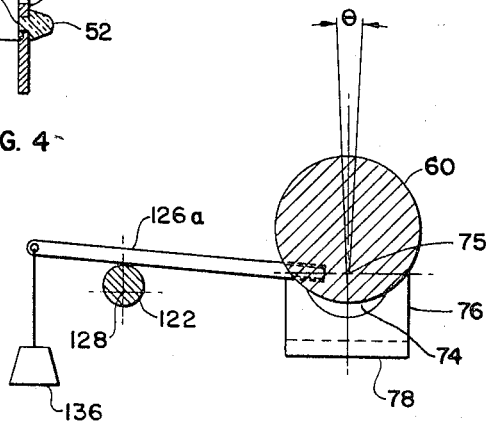
FIG. 2a

United States Patent Office 3,445,364
Patented May 20, 1969

3,445,364
VIBRATOR-DEPOLARIZER FOR COULOMETRIC TITRATOR
Allen Strickler, Fullerton, Calif., assignor to Beckman Instruments, Inc., a corporation of California
Filed Dec. 30, 1964, Ser. No. 422,191
Int. Cl. C23b 5/78; B01k 3/06
U.S. Cl. 204—195                                                15 Claims

ABSTRACT OF THE DISCLOSURE

A coulometric reagent generator in which means are provided for vibrating the titrant generating electrode and for pulsating the electrolyte delivered to the generator to maximize the titrant output of the generator. In one embodiment, the titrant generating electrode is formed of a dissolvable material such as silver and means are provided for automatically advancing such electrode toward the electrolyte chamber of the generator as the electrode dissolves during the generating process.

---

This invention relates generally to external coulometric titrators and more particularly to improvements in the reagent generating capacity of the reagent generator used with this type of titrator.

Coulometric titration utilizes the known principle that the rate of generation of reagent or titrant, produced by the electrolysis of a suitable electrolyte, is directly proportional to the electrical current involved in the electrolysis. In the past, coulometric generation of titrant has usually employed an "internal" technique. In such titrations, the electrical current is passed between a pair of electrodes immersed in the sample medium which is to be titrated. More recently, the possibility of "external" generation of reagent has been demonstrated. In this technique, reagent is generated by passing the current through an electrolyte contained in a cell remote from the titration cell, then transferring the reagent formed by the electrolysis to the solution to be titrated. In both of these methods of titration, the rate of generation of reagent is directly proportional to the current traversing the generating electrodes.

In the use of external reagent generators as, for example, of the type disclosed in copending application Ser. No. 143,658, filed Oct. 9, 1961, and entitled "Coulometric Reagent Generator," now U.S. Patent No. 3,244,608, it has been found that especially when reagents other than hydrogen ions ($H^+$) and hydroxyl ions ($OH^-$) are generated, for example, silver ions ($Ag^+$) used in the titration of chloride, certain limitations are imposed on the generating capacity (i.e., the rate at which reagent is generated) of the reagent generator. As the voltage across the cell is increased in an effort to increase the rate of silver ion generation, the silver ion concentration at the cathode surface increases sharply, that is, there is an increase in the "concentration polarization." This results in an increased "back E.M.F." which opposes the applied voltage, and limits any further increase of current without increase of applied potential.

As the voltage across the cell is increased, the water in the electrolyte is oxidized to $O_2$ and $H^+$ at the anode and the $H^+$ is reduced to $H_2$ at the cathode. Since coulometric titration is predicated on the occurrence of a single known electrolytic process with quantitative ion conversion proportional to current, this competing process results in an error or uncertainty in the amount of silver ion generated. Also, the oxygen and hydrogen thus evolved form small bubbles which cling to the surfaces of the respective electrodes. The current capacity, and consequently, the reagent generation capacity of the cell, is further reduced as a result of this phenomenon.

It is known in the electrolysis art that agitation of the electrolyte will decrease ion concentration and gas bubbles at the electrodes thereby increasing the capacity of the cell. However, as far as can be determined, heretofore no efforts have been made to devise a coulometric titration reagent generator in which the electrolyte is agitated, or as an alternative to electrolyte agitation or in conjunction therewith, a vibratory or oscillatory motion is imparted to one or both of the electrodes. For example, it has been found that vibrating the silver anode in the coulometric titration of chloride results in a much larger useful cell current than had heretofore been achieved.

The improvement in reagent generator capacity as a result of electrode vibration was most apparent when it was applied to the reagent generator of the type disclosed in the above referenced copending application. In general terms, the copending application describes and shows a coulometric reagent generator comprising first and second porous diaphragms having interior and exterior surfaces, a housing supporting the diaphragms for defining an electrolyte chamber between the interior surfaces of the diaphragms, and first and second conducting electrodes held in contact with the exterior surfaces of the respective diaphragms. Electrolyte, delivered to the electrolyte chamber, flows through the pores of the diaphragms making contact with the electrodes at which the reagent is generated.

In modifying the reagent generator of the copending application for use in the titration of chloride with silver ions, a solid silver anode was provided, the working face of which was spaced a small distance from the exterior surface of the corresponding porous diaphragm. It was found that agitation of the electrolyte (by pulsating the electrolyte in the tube supplying the electrolyte chamber) alone gave a moderate improvement in current flow. Apparently, damping of the pulsating electrolyte by the porous diaphragms limited the benefits which otherwise might have been obtained. Vibration of the anode in conjunction with pulsation of the electrolyte, however, markedly increased the cell's current flow. Furthermore, when the reagent generator of the copending application, modified in accordance with the present invention, was used in an automatic, continuous coulometric chloride titrator employing a feedback control circuit, the response time of the system could be reduced several fold. This resulted from the reduction in filtering required in the system since "noise" occurring as a result of instability in the polarization layer next to the generating electrode was greatly reduced.

Accordingly, it is an object of the present invention to provide an improved coulometric reagent generator of high capacity in which losses in coulometric efficiency are kept to a minimum.

It is another object of the present invention to provide an improved coulometric reagent generator for use in an automatic, continuous coulometric titration system which coulometric reagent generator will permit a substantially improved response time of the system.

It is a further and more specific object of the present invention to provide an improved coulometric reagent generator in which relative motion between the electrolyte and working electrode is furnished so that a greater reagent generator capacity and improved coulometric accuracy are made possible by the reduction of "concentration polarization," secondary reactions and gas bubbles at the electrode surfaces.

According to a first, specific, exemplary embodiment of the invention, useful in the titration of chloride, there is provided a reagent generator of the type disclosed in the copending application referenced above, in which a dissolvable silver anode in the form of a solid, elongated bar is used. The anode has a working face adjacent the exterior surface of one of the porous diaphragms. The anode is spring-biased toward the exterior face of the porous diaphragm so that it advances as the working face dissolves in consequence of the electrolysis process. Means are provided for maintaining a constant, small distance between the working face of the anode and the exterior surface of the diaphragm. A vibratory oscillation of the anode is provided by a motor-driven cam and cam follower arrangement. In addition to the motion imparted to the anode, a mechanical device may be provided for pulsating the electrolyte delivered to the reagent generator to further increase the generator's current capacity.

According to a second, specific exemplary embodiment of the invention useful in titrations involving the generation of bromine or iodine, both anode and cathode of the reagent generator of the copending, referenced application are in the form of platinum wires terminating at their working ends in a wound spiral configuration. The other end of the anode is affixed to a piezoelectric drive element which imparts vibrations of high frequency to the wire. As in the first embodiment briefly described above, the vibration of the electrode may be accompanied by pulsation of the electrolyte to further augment the generator's capacity.

The novel features which are believed to be characteristic of the invention are set forth with particularity in the appended claims. The invention itself however, together with further objects and advantages thereof, can best be understood by reference to the following description taken in connection with the accompanying drawings in which:

FIG. 2 is a section view of the apparatus of FIG. 1 taken along the plane 2—2;

FIG. 2a is a section view of an alternative embodiment of the apparatus of FIG. 1 taken along the plane 2—2;

FIG. 3 is a front view of a snap-ring forming part of the present invention;

FIG. 4 is a section view of the snap-ring of FIG. 3 taken along plane 4—4;

Figure 1:
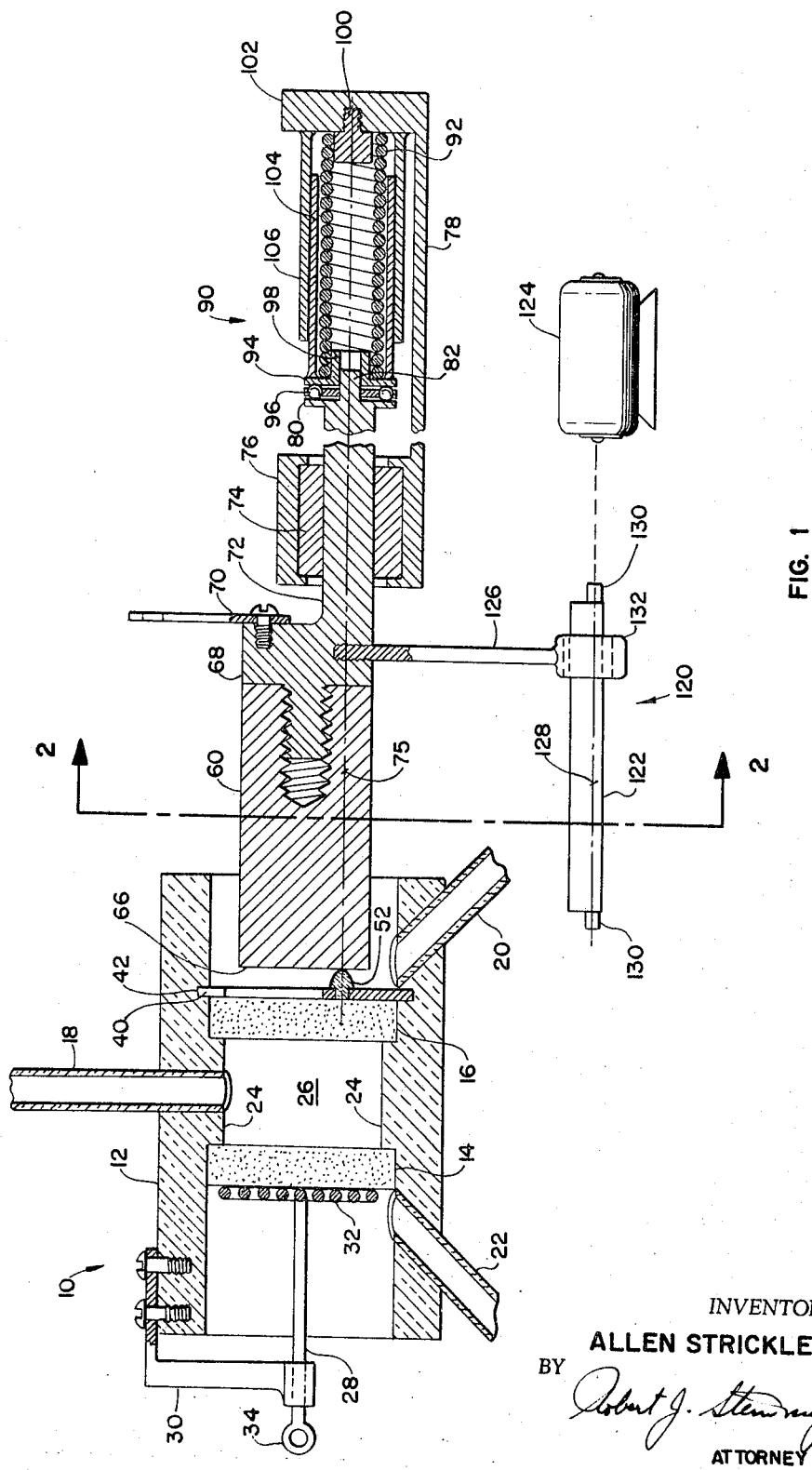
FIG. 1 is a front view, in section, of a reagent generator employing the present invention.

Referring now to FIGS. 1, 2, 3 and 4, there is shown a reagent generator cell 10 of the type disclosed in the referenced, copending application, comprising generally a tubular housing 12, a pair of porous diaphragms 14 and 16 mounted in spaced-apart relation across the bore of the housing 12, an electrolyte feed tube 18, a reagent outlet tube 20 and a waste outlet tube 22. The porous diaphragms 14 and 16 are spaced by means of abutments 24 formed in the interior wall surface of the housing 12. An electrolyte chamber 26 is formed by the interior surfaces of the porous diaphragms 14 and 16 and the interior wall surface of the housing 12. Electrolyte is supplied to the electrolyte chamber 26 through the feed tube 18 at a substantially constant rate by a suitable pump (not shown).

A wire cathode 28 is carried by bracket 30 which in turn is securely mounted to the housing 12. The wire cathode 28 is normally fabricated of a noncorrosible or noble metal, e.g., platinum. The "working" end 32 of the cathode 28 is shaped in a helical configuration and is held in contact with the exterior surface of the porous diaphragm 14 by means of the bracket 30. The other end of the cathode terminates in an electrical terminal lug 34.

A snap-ring 40, made of a suitable inert metal, is mounted in a groove 42 formed in the interior wall of the housing 12 immediately adjacent the exterior surface of the porous diaphragm 16. FIGS. 3 and 4 show the snap-ring in greater detail. A pair of holes 44, provided in the projecting ears 46, facilitate the installation and removal of the snap-ring 40. A tab 48, projecting inwardly from the bottom portion of the snap-ring 40 and having a small hole 50 formed therein, is adapted to support a spacer-bearing 52. The spacer-bearing 52, which may be fabricated of a hard, inert material such as sapphire or diamond, has a rounded conical point and a small cylindrical projection 54 which serves as a means for mounting the spacer-bearing 52 in the hole 50. The hole 50 and the cylindrical projection 54 are dimensioned so that a moderate press fit results upon installation of the spacer-bearing 52.

The anode assembly of the reagent generator generally comprises an anode 60, an automatic feed or advance mechanism 90 and a cam drive mechanism 120. The anode 60, fabricated of silver, is in the form of an elongated cylinder and has a "working" face 66 which projects into the right hand bore (as viewed in FIG. 1) of the housing 12. Electrolyte, flowing from the electrolyte chamber 26 through the porous diaphragm 16, makes contact with and reacts at the working face 66 of the anode 60. The reagent produced by the reaction flows down and out of the reagent outlet tube 20. The working face 66 bears against the conically-shaped point of the spacer-bearing 52 under a biasing force provided by the advance mechanism 90 which is described in detail below. A small distance separating the working face 66 from the exterior surface of the porous diaphragm 16 is thereby maintained and is determined by the over-all length of the spacer-bearing 52. The outer cylindrical surface of the anode 60 is coated with a thin layer of a brittle insulating material so that erosion of the anode 60, as a result of the reaction with the electrolyte, is confined to the working face 66.

The anode 60 is threadedly secured, at the end opposite the working face 66, to an anode mounting pad 68. An electrical terminal 70 is affixed to the rear surface of the anode mounting pad 68. An eccentric shaft 72, which comprises an extension of the mounting pad 68, is mounted for rotation and axial displacement in a bearing 74 which in turn is securely mounted in a bore provided in a vertical leg 76 of a base frame 78. The bearing 74 furnishes the sole support for the anode 60 and the anode mounting pad 68, the spacer-bearing 52 functioning in this respect only as a longitudinal bearing surface against which the anode 60 is biased. As best shown in FIG. 1, the point of contact between the spacer-bearing 52 and the working face 66 lies on a rotational axis 75 of the eccentric shaft 72. The eccentric shaft 72 terminates, at the end opposite that to which the anode 60 is secured, in a flange 80. Centrally located on and projecting a short distance from the rear surface (i.e., the surface facing away from the anode 60) of the flange 80, is a stud shaft 82, the purpose of which is described below.

The advance mechanism 90 produces a generally axial biasing force on the anode 60. As a result, although the working face 66 of the anode 60 is continually being eroded by the reaction with the electrolyte, the proper distance between the working face 66 and the exterior surface of the porous diaphragm 16, as determined by the size of the spacer-bearing 52, is maintained. The advance mechanism 90 comprises essentially a compression spring 92 which expands against a thrust washer 94 journaled on the shaft 82. The force produced by the compression spring 92 is transmitted to the rear face of the flange 80 through a thrust bearing 96 which is carried by the shaft 82. This arrangement prevents the spring 92 from being subjected to torsional forces resulting from rotation of the shaft 72. The forward end of spring 92 is mounted on a rearwardly extending tubular projection 98 which forms part of the thrust washer 94. The rear end of the spring 92 is supported by a short, cylindrical projection 100 which is threadedly secured to the front face of an upwardly extending leg 102 of the base frame 78. To prevent the coils of the spring 92 from sagging or bunching up, there is provided a pair of telescoping tubes 104 and 106, the former extending rearwardly from the rear face of the thrust washer 94 and the latter extending forwardly from the front face of the vertical leg 102. The tubes 104 and 106 are dimensioned so as to permit free axial movement between them as the spring 92 expands.

The cam drive mechanism 120 imparts a rapid, oscillatory motion to the anode 60 through the mounting pad 68. One embodiment of this mechanism, which is shown in FIGS. 1 and 2, comprises an elongated, cylindrical cam 122 driven by a small electric motor 124, and a cam follower 126 threadedly secured at its upper end to the anode mounting pad 68. The cam 122 is mounted for rotation about an eccentric axis 128 on a pair of spaced bearings 130. As best shown in FIG. 2, the cam follower 126 terminates at its lower end in a yoke 132 having an elongated slot 134 in which the cam 122 rotates. As the cam 122 rotates, the anode 60 oscillates about the axis 75 through an angular excursion $\theta$ determined by the eccentricity of the cam 122.

As an alternative to the specific cam mechanism depicted in FIG. 2, a simpler cam arrangement is illustrated in FIG. 2a. In the embodiment of FIG. 2a, the eccentric cam 122 is mounted alongside and parallel to the anode 60. A cam follower 126a rests on the top surface of the cam 122 and is biased downwardly by a small weight 136 so that contact is maintained between the cam follower 126a and the cam 122 as the latter rotates.

In the operation of the apparatus of FIG. 1 (in which either the cam mechanism of FIG. 2 or FIG. 2a may be employed), a source of electrical potential is connected to the lug 34 of the cathode 28 and to the terminal 70 of the anode 60. Electrolyte is pumped at a substantially constant rate through the feed tube 18 into the electrolyte chamber 26. The electrolyte flows through the porous diaphragms 14 and 16 and reacts at the working end 32 of the cathode 28 and the working face 66 of the anode 60. Reagent flows from the reagent generator cell outlet tube 20 and waste flows from the outlet tube 22. A rapid oscillation of the anode 60 is provided by the cam mechanism 120 while the advance mechanism 90 furnishes a biasing force which advances the anode 60 as it dissolves at the working face 66. As the length of the anode 60 decreases, the cam follower 126 travels along the length of the cam 122. When the anode 60 is entirely consumed, that is, when the working face 66 is immediately adjacent the threaded portion of the anode 60, the front face of the flange 80 comes in contact with the bearing 74 thereby preventing further advancement of the anode 60. An automatic shut-off device (not shown), actuated by the flange 80, may be provided to stop the operation of the apparatus when the anode is entirely consumed. Similarly, a suitable signalling means (not shown) also may be provided to indicate that replacement of the anode is required.

Figure 5:
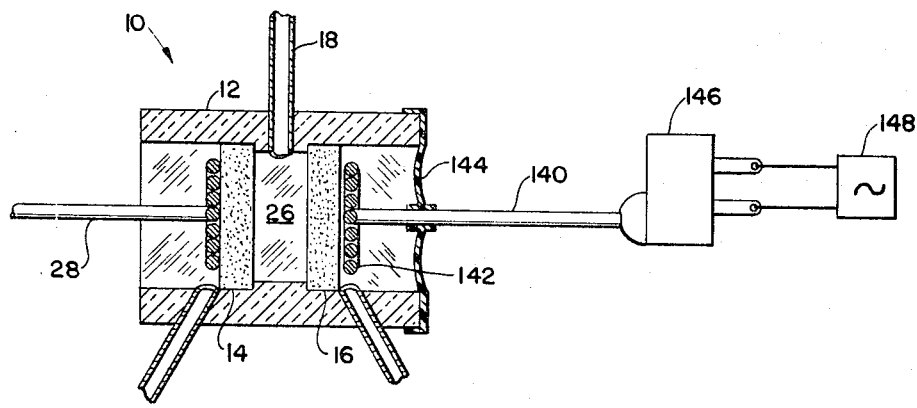
FIG. 5 is a front view, in section, of a reagent generator employing an alternative embodiment of the present invention.

Turning now to FIG. 5, there is shown a reagent generator cell 10 of the type described and shown in the copending application referenced above having a wire cathode 28, and a wire anode 140 with a working end 142 which is spirally configured similar to that of the cathode 28. Both electrodes are made of an inert material such as platinum or the like. This reagent generator may be used in the generation of bromine or iodine titrant or the like in which the titrant is generated from the electrolyte solution itself, e.g., bromide or iodide solution; that is, the working electrode is not dissolved in the process of producing the titrant.

The anode 140 is mounted in a resilient cap or boot 144 which fits over the anode end of the reagent generator housing 12. The boot 144 also serves to position the anode 140 so that a small clearance space exists between the working end 142 and the exterior surface of the porous diaphragm 16. The exterior end of the anode 140 is secured to a piezoelectric transducer 146. A suitable transducer for this purpose may be a barium titanate phonograph pickup unit, operated in "reverse," that is, an electrical input to the transducer 146 from an oscillator 148 producing a mechanical, vibratory output. The exterior end of the anode 140 may be inserted in the opening normally occupied by the phonograph needle. The oscillator 148 may be operated at any desired frequency, including ultrasonic, within the range of response of the transducer 146.

Figure 6:
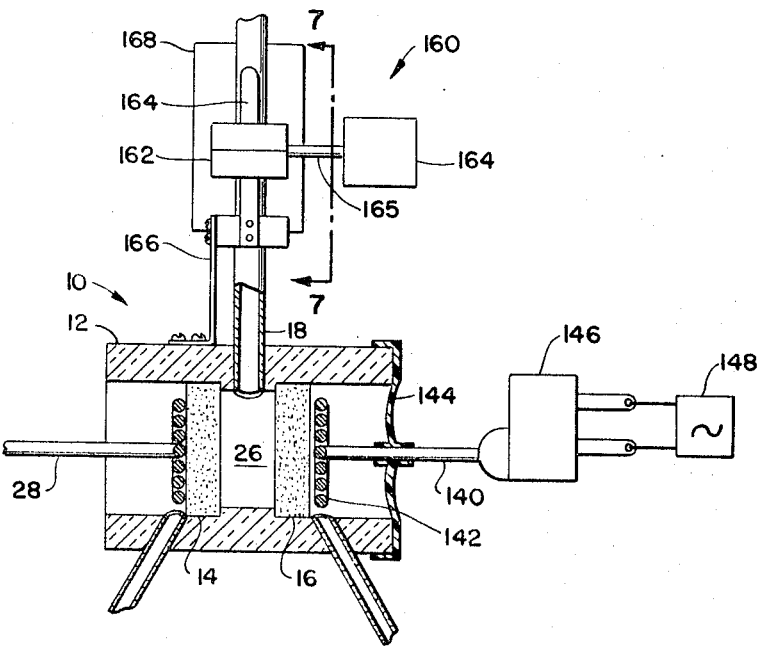
FIG. 6 is a front view, in section, of the reagent generator of FIG. 5 in which a mechanism is included for pulsating the electrolyte flowing to the reagent generator cell.
Figure 7:
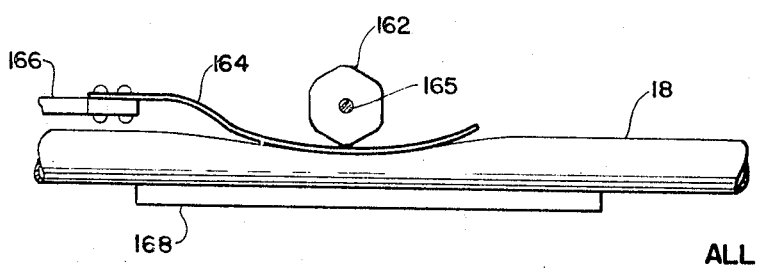
FIG. 7 is a side view, in section, of the electrolyte pulsating mechanism of FIG. 6, taken along plane 6—6.

In FIGS. 6 and 7 there is shown a mechanical electrolyte pulsating mechanism 160 which may be used as an alternative to or in conjunction with an anode vibrator such as illustrated in FIG. 1 or 5. The function of the electrolyte pulsator is to impose a small amplitude, high frequency or vibrational pressure component on the electrolyte flowing to the chamber 26 by periodically squeezing the feed tube 18 which is made of a pliable, elastomeric plastic material such as Tygon. The resultant agitation of the electrolyte at the electrode surfaces tends to increase the reagent generator capacity by decreasing "concentration polarization" and clearing the electrode surfaces of gas bubbles. Loss of vibrational pressure in the direction away from the cell is prevented by the sealing action of the positive displacement pump (not shown) which delivers the electrolyte to the reagent generator 10 through the electrolyte feed tube 18.

In the particular, exemplary embodiment shown in FIGS. 6 and 7, the electrolyte pulsator comprises a lobed cam 162 coupled to a small electric motor 164 by a shaft 165. The axis of rotation of the cam in the embodiment shown is substantially perpendicular to the longitudinal axis of the feed tube 18, although it will be obvious that the cam axis can be oriented in any desired direction with respect to the tube axis. As the cam 162 rotates, the lobes depress a tamper 164 which may be made from spring steel sheet material and which is suitably mounted on an angle bracket 166. The cam 162 is positioned with respect to the feed tube 18 so that the tamper 164, at its maximum displacement, does not completely seal off the feed tube 18. A backing plate 168 is mounted opposite the tamper 164 to prevent bending of the feed tube 18 when the cam 162 depresses the tamper 164.

Although exemplary embodiments of the invention have been disclosed and discussed, it will be understood that other embodiments may be constructed employing the teachings of this invention. Thus, in the advance mechanism 90 of FIG. 1, a longitudinal drive screw powered by a clock spring or an unwinding weight may be substituted for the spring arrangement illustrated. Further changes, modifications and substitutions which may

What is claimed is:

1. In a coulometric reagent generator, the combination of
   a housing;
   means defining an electroylte chamber in said housing;
   means for continuously delivering an electrolyte to said electrolyte chamber;
   a pair of conducting electrodes adjacent said electrolyte chamber, said electrolyte from said electrolyte chamber flowing over and reacting at said electrodes;
   means for vibrating at least one of said electrodes, said one electrode dissolving as a result of said reaction; and
   means for advancing said one electrode toward said electrolyte chamber as said electrode dissolves.

2. The coulometric reagent generator of claim 1 in which
   said means for vibrating said electrode comprises a piezoelectric transducer energized by an oscillator.

3. The coulometric reagent generator of claim 1 in which
   said means for vibrating said electrode comprises a cam follower secured to said electrode and a rotatable cam for actuating said cam follower.

4. The coulometric reagent generator of claim 1 in which
   said means for continuously delivering said electrolyte to said electrolyte chamber includes means for pulsating said electrolyte during said delivery.

5. The coulometric reagent generator of claim 4 in which
   said electrolyte delivery means includes a feed tube for supplying electrolyte to said electrolyte chamber; and
   said pulsating means is mounted on said feed tube.

6. The coulometric reagent generator of claim 5 in which
   said feed tube is made from an elastomeric material;
   said pulsating means comprises
   a tamper plate and a backing plate which sandwich said feed tube; and
   a rotatable cam having at least one lobe whereby, as said cam is rotated, said lobe periodically depresses said tamper plate thereby squeezing said feed tube between said tamper plate and said backing plate.

7. In a coulometric reagent generator, the combination of
   a housing;
   means mounted in said housing defining an electrolyte chamber therein, said means comprising first and second porous diaphragms, said diaphragms having interior surfaces defining said chamber and exterior surfaces;
   means for continuously delivering an electrolyte to said electrolyte chamber;
   first and second conducting electrodes mounted adjacent said exterior surfaces of the respective diaphragms, said electrolyte flowing from said electrolyte chamber through said diaphragms over said electrodes; and
   means for vibrating said first electrode.

8. The coulometric reagent generator of claim 6 in which
   said first electrode is mounted so that it is spaced a small distance from said exterior surface of said first porous diaphragm and said second electrode is mounted so that said second electrode is in contact with said exterior surface of said second porous diaphragm.

9. The coulometric reagent generator of claim 8 in which
   said means for vibrating said first electrode comprises a piezoelectric transducer powered by an oscillator.

10. The coulometric reagent generator of claim 8 in which
    said first electrode comprises an elongated bar of material which reacts with said electrolyte to produce a reagent for titrating a test solution, said bar having a working face which comes in contact with said electrolyte and said bar dissolving at said working face as a result of said reaction with said electrolyte.

11. The coulometric reagent generator of claim 10 which includes
    force means for biasing said first electrode toward said exterior surface of said first porous diaphragm; and
    spacer-bearing means against which said working face of said first electrode is biased, said spacer-bearing means being mounted in said housing, whereby said working face is kept spaced said small distance from said exterior surface of said first porous diaphragm.

12. The coulometric reagent generator of claim 11 in which
    said electrode vibrating means comprises rotatable cam means adapted to drive a cam follower secured to said electrode.

13. The coulometric reagent generator of claim 12 in which
    said means for continuously delivering said electrolyte to said electrolyte chamber includes means for pulsating said electrolyte during said delivery.

14. In a coulometric generator, the combination of
    a housing;
    first and second porous diaphragms having interior and exterior surfaces mounted in said housing, said interior surfaces defining an electrolyte chamber;
    a feed tube connected to said electrolyte chamber for continuously delivering electrolyte from a source to said electrolyte chamber;
    a spacer-bearing mounted adjacent said exterior surface of said first porous diaphragm;
    a first, elongated, metallic electrode having a longitudinal, eccentric axis and a working face over which said electrolyte flows, said working face being in contact with said spacer-bearing, said electrode dissolving at said working face as a result of a reaction with said electrolyte;
    said spacer-bearing lying on said longitudinal, eccentric axis of said first electrode;
    a mounting pad having a first surface adapted to mount said first electrode and a shaft extending from a second surface opposite said first surface, said shaft having a longitudinal axis of rotation and being rotatably and slidably mounted in a fixed bearing and having an end extending from said bearing;
    said longitudinal, eccentric axis of said first electrode being coincident with said longitudinal axis of said shaft;
    a spring adapted to impart an axial, biasing force against said end of said shaft whereby said first electrode is continually advanced while said electrode dissolves and whereby said working face of said first electrode is continually pressed against said spacer-bearing;
    an elongated, rotatable, motor-driven cam of given length extending substantially parallel to said first electrode;
    a cam follower having one end adapted to engage said cam and another end secured to said mounting pad whereby an angular, oscillatory motion is imparted to said mounting pad and whereby said cam follower moves along said length of said cam as said first electrode advances; and
    a second electrode mounted in contact with said exterior surface of said second porous diaphragm.

15. The coulometric reagent generator of claim 14 in which
    said feed tube is made of a pliable material; and which includes an electrolyte pulsating means comprising
a tamper plate and a backing plate which sandwich said feed tube; and
a rotatable cam having at least one lobe whereby, as said cam is rotated, said lobe periodically depresses said tamper plate thereby squeezing said feed tube between said tamper plate and said backing plate.

References Cited

UNITED STATES PATENTS

| | | | |
|---|---|---|---|
| 2,865,832 | 12/1958 | Pitzer | 204—222 |
| 3,331,760 | 7/1967 | Powell | 204—222 |
| 3,208,926 | 9/1965 | Eckfeldt | 204—1.1 |
| 3,341,430 | 9/1967 | Wickerham et al. | 204—195 |

OTHER REFERENCES

Levine, "Instruments & Automation," May 1957, p. 883.

Lingave, "Electroanalytical Chemistry," 2nd ed., 1958, pp. 525–528.

JOHN H. MACK, *Primary Examiner.*

T. TUNG, *Assistant Examiner.*

U.S. Cl. X.R.

204—222, 225